(12) United States Patent
Suzuki

(10) Patent No.: US 7,860,479 B2
(45) Date of Patent: Dec. 28, 2010

(54) FM RECEIVER

(75) Inventor: Jun Suzuki, Kumagaya (JP)

(73) Assignees: Sanyo Semiconductor Co., Ltd.,
Gunma (JP); Sanyo Electric Co., Ltd.,
Osaka (JP)

( * ) Notice: Subject to any disclaimer, the term of this patent is extended or adjusted under 35 U.S.C. 154(b) by 548 days.

(21) Appl. No.: 12/068,525

(22) Filed: Feb. 7, 2008

(65) Prior Publication Data

US 2008/0194220 A1 Aug. 14, 2008

(30) Foreign Application Priority Data

Feb. 13, 2007 (JP) ............................. 2007-031832

(51) Int. Cl.
*H04B 1/10* (2006.01)
*H04B 17/00* (2006.01)

(52) U.S. Cl. .................. 455/307; 455/67.13; 455/339

(58) Field of Classification Search ............... 455/63.1, 455/67.11, 67.13, 131, 207, 226.1, 226.2, 455/295, 296, 307, 334, 339
See application file for complete search history.

(56) References Cited

U.S. PATENT DOCUMENTS

| | | | | |
|---|---|---|---|---|
| 4,918,532 A | * | 4/1990 | O'Connor | ................... 455/207 |
| 5,023,939 A | * | 6/1991 | Hori | ........................ 455/188.1 |
| 5,287,557 A | | 2/1994 | Hansen | |
| 5,691,666 A | * | 11/1997 | Owen | .......................... 455/316 |
| 7,177,615 B2 | * | 2/2007 | Ono | ............................ 455/296 |
| 7,522,896 B2 | * | 4/2009 | Oshima et al. | .............. 455/339 |
| 2001/0026597 A1 | | 10/2001 | Komiyama | |
| 2005/0020220 A1 | | 1/2005 | Gamou | |

FOREIGN PATENT DOCUMENTS

| | | |
|---|---|---|
| DE | 42 44 630 A1 | 7/1993 |
| EP | 1 379 003 A2 | 1/2004 |
| JP | A-2004-312077 | 11/2004 |
| WO | WO 89/12352 | 12/1989 |
| WO | WO 00/77939 A1 | 12/2000 |

* cited by examiner

*Primary Examiner*—Quochien B Vuong
(74) *Attorney, Agent, or Firm*—Oliff & Berridge, PLC

(57) ABSTRACT

An FM receiver that is suitable for reducing a transmission bandwidth $W_F$ of a bandpass filter to remove adjacent-channel interference, and increasing $W_F$ to prevent audio distortion. A detection output signal $S_{OUT}$ is inputted to an HPF 122 when a reception electric field strength signal $S_{M\text{-}DC}$ indicates an intermediate or stronger electric field. In a weak electric field, an AC component signal $S_{M\text{-}AC}$, which is extracted from an intermediate signal $S_{IF1}$ prior to detection and which has fewer high-pass noise components than $S_{OUT}$, is inputted to the HPF 122. A control circuit 120 detects a case as an adjacent-channel interference state when a large amount of high-pass components passes through the HPF 122, and reduces $W_F$ of an IFBPF 70 in order to remove adjacent-channel interference. When a small amount of high-pass components is transmitted, $W_F$ is increased in order to minimize audio distortion.

5 Claims, 6 Drawing Sheets

(prior art)

FIG.6

| | WEAK ELECTRIC FIELD STATE ($S_{M-DC} \leq d_{DC}$) | INTERMEDIATE OR STRONGER ELECTRIC FIELD ($S_{M-DC} > d_{DC}$) |
|---|---|---|
| STRONG HIGH-PASS COMPONENT STATE ($V_{HF} > d_{HF}$) | NARROW BANDWIDTH ($W_F = W_N$) | NARROW BANDWIDTH ($W_F = W_N$) |
| WEAK HIGH-PASS COMPONENT STATE ($V_{HF} \leq d_{HF}$) | REFERENCE BANDWIDTH ($W_F = W_W$) | REFERENCE BANDWIDTH ($W_F = W_W$) |

FIG.7

| | WEAK ELECTRIC FIELD STATE ($S_{M-DC} \leq d_{DC}$) | INTERMEDIATE OR STRONGER ELECTRIC FIELD ($S_{M-DC} > d_{DC}$) |
|---|---|---|
| STRONG HIGH-PASS COMPONENT STATE ($V_{HF} > d_{HF}$) | NARROW BANDWIDTH ($W_F = W_N$) | NARROW BANDWIDTH ($W_F = W_N$) |
| WEAK HIGH-PASS COMPONENT STATE ($V_{HF} \leq d_{HF}$) | LOW MODULATION ($V_{LF} \leq d_{LF}$) NARROW BANDWIDTH ($W_F = W_N$) <br><br> HIGH MODULATION ($V_{LF} > d_{LF}$) REFERENCE BANDWIDTH ($W_F = W_W$) | REFERENCE BANDWIDTH ($W_F = W_W$) |

FM RECEIVER

CROSS-REFERENCE TO RELATED APPLICATION

The priority application number JP2007-031832 upon which this patent application is based is hereby incorporated by the reference.

BACKGROUND OF THE INVENTION

1. Field of the Invention

The present invention relates to an FM receiver for receiving a frequency-modulated signal, and particularly relates to removing adjacent-channel interference and reducing audio distortion when receiving an FM transmission or the like.

2. Description of the Related Art

The frequency band necessary to transmit an FM signal is made wider than, e.g., an AM signal, in order to vary the carrier frequency on the basis of an audio signal or the like. Accordingly, when receiving a target transmission signal, an FM receiver tends to receive interference from other signals transmitted at a frequency that is close to the frequency of the target transmission signal (adjacent-channel interference), and the quality of the detected audio signal can be adversely affected by this interference. Reducing the bandwidth of a band-pass filter for extracting the target reception signal makes it possible to reduce the adjacent-channel interference. However, when the FM signal to be received is highly modulated, limiting the bandwidth may create distortion in audio signals in the detected output.

FIG. 1 is a block diagram showing the configuration of a conventional FM receiver. An RF (radio frequency) signal received by an antenna 2 is mixed with a first local oscillation signal in a first mixer circuit 4. The target reception signal is subjected to frequency conversion in order to obtain a first intermediate signal $S_{IF1}$ having a predetermined intermediate frequency $f_{IF1}$.

$S_{IF1}$ is mixed with a second local oscillation signal in a second mixer circuit 6, and subjected to frequency conversion to obtain a second intermediate signal $S_{IF2}$ having a predetermined intermediate frequency $f_{IF2}$. $S_{IF2}$ is passed through an IFBPF 8, which is a bandpass filter (BPF) having $f_{IF2}$ as the central frequency. $S_{IF2}$ is then subjected to FM detection using a detection circuit 10, and an extracted detection output signal $S_{OUT}$ is outputted to an output circuit comprising a speaker or the like.

The first intermediate signal $S_{IF1}$ is used to generate a reception electric field strength signal $S_{M-DC}$ by using a signal meter (S meter circuit 14). In the S meter circuit 14, a measured signal generated on the basis of $S_{IF1}$ is smoothed by a capacitor $C_{01}$ and converted to direct current in order to generate $S_{M-DC}$.

The IFBPF 8 is configured so as to be capable of controlling a bandwidth $W_F$ using a bandwidth controller 12. The bandwidth controller 12 switches the bandwidth $W_F$ on the basis of $S_{OUT}$ and $S_{M-DC}$. FIG. 2 shows a block diagram of the configuration of the bandwidth controller 12. $S_{OUT}$ is inputted to a high-pass filter (HPF) 20 and a low-pass filter (LPF) 22.

The HPF 20 has a cut-off frequency of, e.g., approximately 100 kHz, and frequency components that exceed the audio band pass through the HPF 20. The high-pass signal that has passed through the filter is smoothed by a capacitor $C_{02}$, and the terminal voltage of the $C_{02}$ is inputted to a control circuit 24 as the output level of the HPF 20.

The LPF 22 transmits, for example, audio band signal components contained in $S_{OUT}$. The output of the LPF 22 is inputted to the control circuit 24 via a switch 26. The switch 26 is controlled by $S_{M-DC}$, and is selectively switched on when the reception electric field strength is in a predetermined weak electric field state.

The high-pass components in $S_{OUT}$ increase when adjacent-channel interference occurs. In response, when the control circuit 24 senses that the output level $V_{HF}$ of the HPF 20 is equal to or greater than a predetermined threshold $d_{HF1}$, the transmission bandwidth $W_F$ of the IFBPF 8 is set to be narrower than a reference bandwidth. The effects of adjacent-channel interference can thereby be removed or reduced. When the transmission bandwidth $W_F$ is reduced, audio distortion may increase as described above. However, adjacent-channel interference has a greater effect on the audio quality than audio distortion in a state in which the reception electric field strength is maintained. Accordingly, it is preferable to remove adjacent-channel interference by restricting the bandwidth.

By contrast, in a weak electric field state, the amount of high-frequency components of noise contained in the detected output signal $S_{OUT}$ is higher than in intermediate or greater electric field states. Accordingly, the control circuit 24 mistakenly detects the noise components that pass through the HPF 20 as being caused by adjacent-channel interference, and the transmission bandwidth $W_F$ readily narrows. As a result, audio distortion tends to occur in a weak electric field state.

The sensitivity with which adjacent-channel interference is detected in weak electric field states has conventionally been reduced as a countermeasure for the problems described above. Specifically, in a weak electric field state, the switch 26 is switched on, and an audio band signal is inputted to the control circuit 24 from the LPF 22. The control circuit 24 senses a high modulation state in which audio distortion occurs when the output level $V_{LF}$ of the LPF 22 is equal to or greater than a predetermined threshold $d_{LF}$. When a high modulation state is sensed, the control circuit 24 increases the threshold from $d_{HF1}$ to $d_{HF2}$ ($>d_{HF1}$). This threshold is used to evaluate the magnitude of the output level of the HPF 20. Altering the threshold reduces the sensitivity with which the adjacent-channel interference is detected, facilitates setting the IFBPF 8 to the reference bandwidth, and lessens the likelihood of audio distortion occurring during high modulation in a weak electric field state.

When modifying the threshold described above, a problem is presented in that it is not always possible to accurately differentiate between a case in which adjacent-channel interference is actually generated and a case in which noise is present. Specifically, cases in which the threshold $d_{HF2}$ is exceeded include those caused by noise, and the noise can be mistakenly detected as adjacent-channel interference, causing the bandwidth of the IFBPF 8 to be unnecessarily reduced and audio distortion to occur. Cases actually caused by adjacent-channel interference may also be included in the cases between $d_{HF1}$ and $d_{HF2}$. In this case, the bandwidth of the IFBPF 8 is set wide. As a result, the adjacent-channel interference is not removed, and the audio quality may be degraded. In the conventional structure, problems have thus been encountered in that it has not been possible to satisfactorily remove adjacent-channel interference and reduce audio distortion in a weak electric field state or during high modulation.

Japanese Laid-open Patent Application No. 2004-312077 is cited as a document relating to the conventional technique described above.

SUMMARY OF THE INVENTION

The present invention was contrived in order to resolve the abovementioned problems, and an object thereof is to provide an FM receiver that can satisfactorily remove adjacent-channel interference and reduce audio distortion.

An FM receiver according to the present invention, comprises an intermediate signal generating circuit for subjecting a reception signal to frequency conversion in which the carrier frequency of a received target FM signal is shifted to a predetermined intermediate frequency, and generating an intermediate signal; a bandpass filter for allowing a transmission bandwidth to be variably set, and transmitting the received target FM signal that has been converted to the intermediate signal; a detection circuit for subjecting the received target FM signal that has passed through the bandpass filter to detection, and generating a detection output signal; a bandwidth controller for controlling the transmission bandwidth of the bandpass filter; a strength signal generating circuit for generating, on the basis of the intermediate signal, an electric field strength signal according to the strength of a reception electric field; and a fluctuation component signal generating circuit for generating a fluctuation component signal according to fluctuation in an amplitude of the intermediate signal. The bandwidth controller comprises a high-pass filter, which has a cut-off frequency that exceeds the audio band; a switch circuit for selecting either the detection output signal or the fluctuation component signal according to the electric field strength signal, and inputting the selected signal to the high-pass filter; and a control circuit for controlling the transmission bandwidth on the basis of whether a weak high-pass component state or a strong high-pass component state is in effect. The weak high-pass component state occurs when the output level of the high-pass filter is equal to or less than a predetermined reference value, and the strong high-pass component state occurs when the output level exceeds the reference value. The switch circuit outputs the fluctuation component signal when the reception electric field strength is in a predetermined weak electric field state, and outputs the detection output signal when the reception electric field strength exceeds the weak electric field state. The control circuit sets the transmission bandwidth to a predetermined wide bandwidth in the weak high-pass component state, and sets the transmission bandwidth to a narrow bandwidth, which is narrower than the wide band width, in the strong high-pass component state.

BRIEF DESCRIPTION OF THE DRAWINGS

FIG. 6 is an illustration showing a basic control operation of $W_F$; and

FIG. 7 is an illustration showing another control operation for $W_F$.

DESCRIPTION OF THE PREFERRED EMBODIMENTS

Preferred embodiments of the present invention (referred to as "embodiments" hereinafter) will be described hereinafter with reference to the accompanying drawings.

Figure 1:
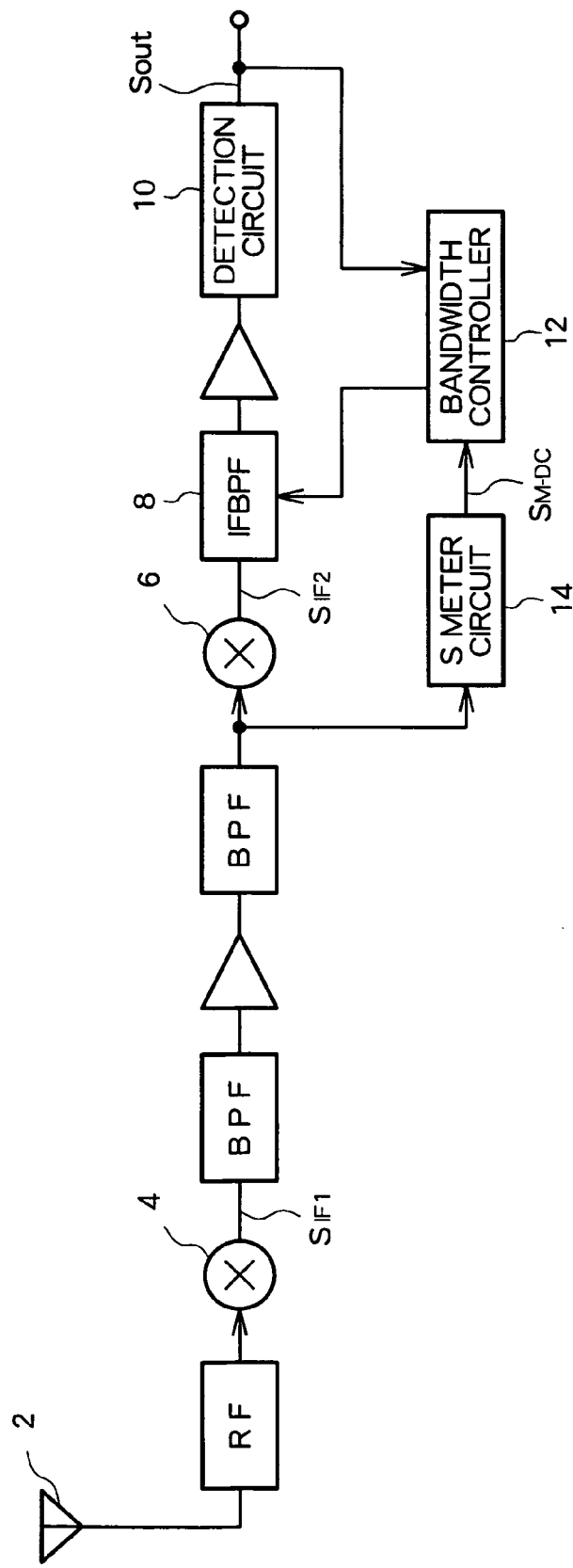
FIG. 1 is a block diagram showing the configuration of a conventional FM receiver.
Figure 2:
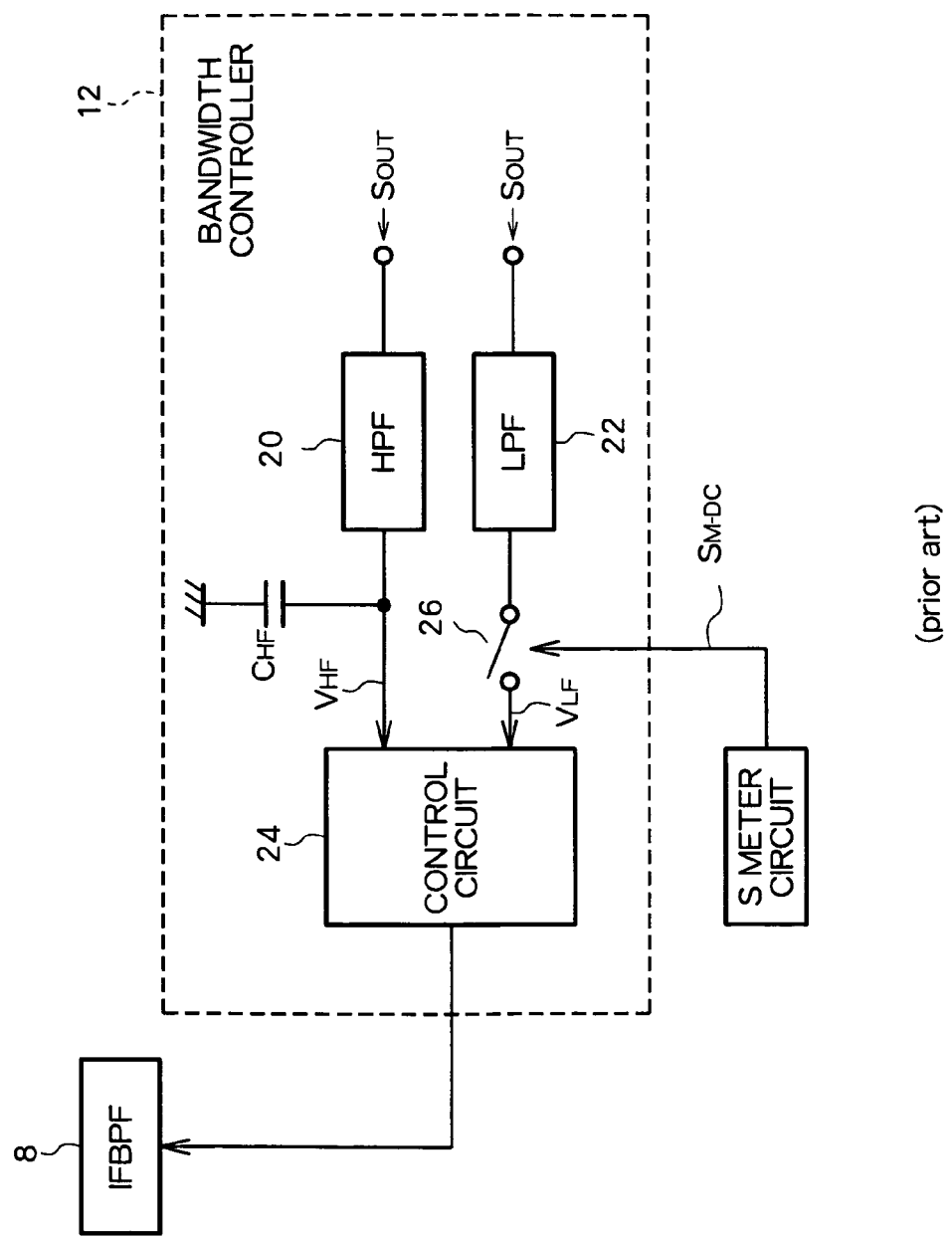
FIG. 2 is a block diagram showing the structure of a bandwidth controller of the conventional FM receiver.
Figure 3:
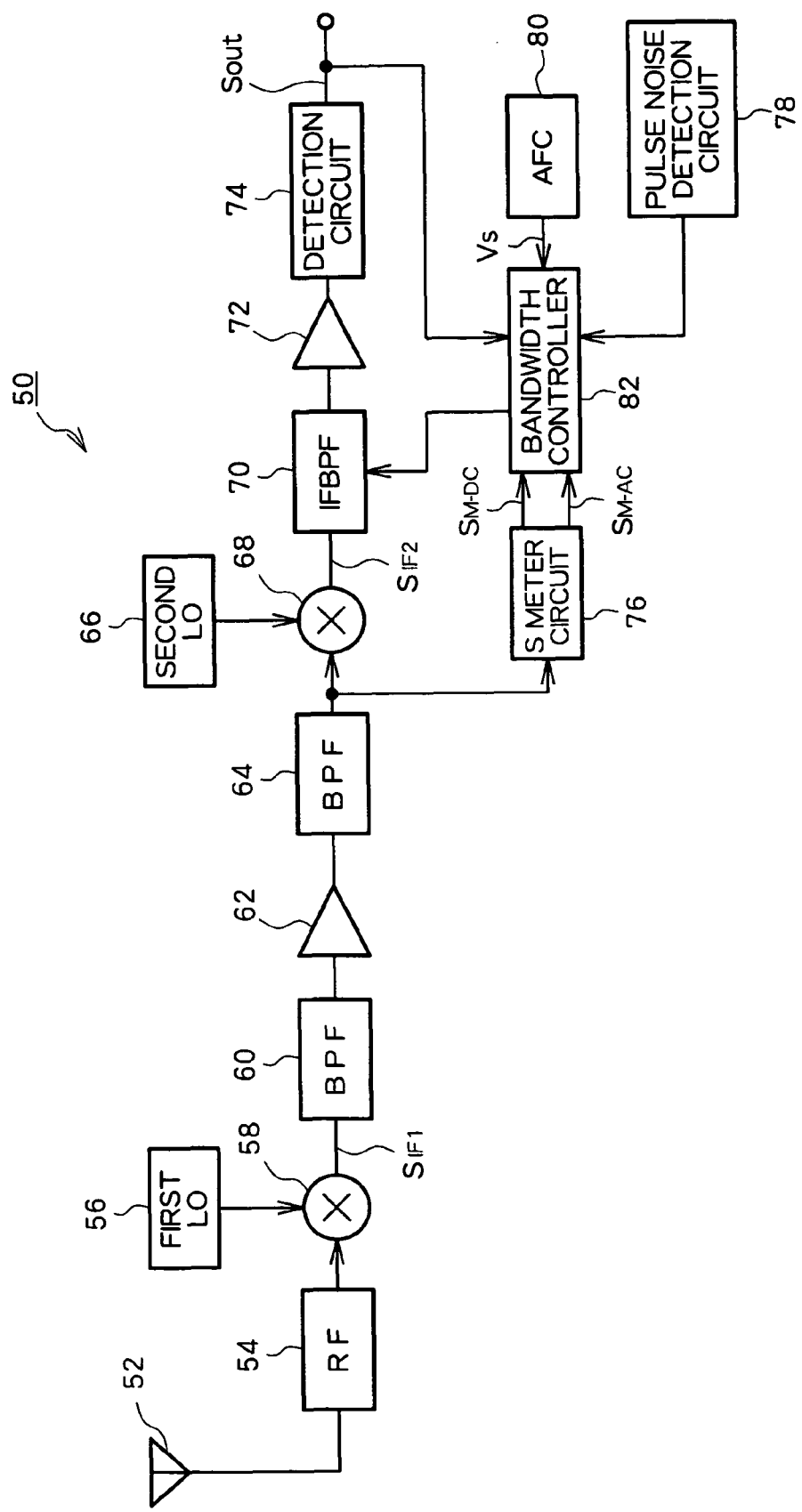
FIG. 3 is a block diagram showing a schematic configuration of an FM receiver that is an embodiment of the present invention.

FIG. 3 is a block diagram showing a schematic configuration of an FM receiver that is an embodiment of the present invention. An FM receiver 50, which has a main portion in the configuration of an integrated circuit (IC), is used in, e.g., an onboard audio device in an automotive vehicle. The FM receiver 50 comprises an antenna 52; an RF amplifier 54; a first local oscillating circuit 56; a first mixer circuit 58; BPFs 60, 64; amplifiers 62, 72; a second local oscillating circuit 66; a second mixer circuit 68; an IFBPF 70; a detection circuit 74; an S meter circuit 76; a pulse noise detection circuit 78; an AFC (automatic frequency control) circuit 80; and a bandwidth controller 82.

An RF signal $S_{RF}$ that has been received by the antenna 52 is amplified by the RF amplifier 54, and then inputted to the first mixer circuit 58. The first mixer circuit 58 mixes the inputted RF signal $S_{RF}$ with a first local oscillating signal $S_{LO1}$, which is inputted from the first local oscillating circuit 56, and generates a first intermediate signal $S_{IF1}$. The frequency $f_{LO1}$ of $S_{LO1}$ is adjusted so that the frequency of a target receiving station signal included in $S_{RF}$ at a frequency $f_R$ is converted to a predetermined intermediate frequency $f_{IF1}$ in the frequency conversion from $S_{RF}$ to $S_{IF1}$ by the first mixer circuit 58. The first intermediate frequency $f_{IF1}$ is set to 10.7 MHz, for example.

$S_{IF1}$ is inputted to the second mixer circuit 68 and the S meter circuit 76 via the BPF 60, the amplifier 62 and the BPF 64, respectively.

The second mixer circuit 68 mixes the inputted first intermediate signal $S_{IF1}$ with a second local oscillating signal $S_{LO2}$, which is inputted from the second local oscillating circuit 66, and generates a second intermediate signal $S_{IF2}$ that has a second intermediate frequency $f_{IF2}$. The frequency $f_{LO2}$ of $S_{LO2}$ is set to ($f_{IF1}$-$f_{IF2}$), and the target reception signal that has the frequency $f_{IF1}$ that is included in $S_{IF1}$ is converted to the frequency $f_{IF2}$ in the second mixer circuit 68. The second intermediate frequency $f_{IF2}$ is set to, e.g., 450 kHz.

$S_{IF2}$ is inputted to the detection circuit 74 via the IFBPF 70 and the amplifier 72. The detection circuit 74 is an FM detection circuit, and comprises, e.g., a quadrature detection circuit. The detection circuit 74 subjects $S_{IF2}$ inputted from the amplifier 72 to FM detection, extracts an audio band detection output signal $S_{OUT}$, and sends the output to an output circuit comprising a speaker or the like.

The S meter circuit 76 generates a reception electric field strength signal $S_{M-DC}$ on the basis of $S_{IF1}$ inputted from the BPF 64, and generates a fluctuation component signal $S_{M-AC}$ deriving from, e.g., adjacent-channel interference or noise included in $S_{IF1}$.

Figure 4:
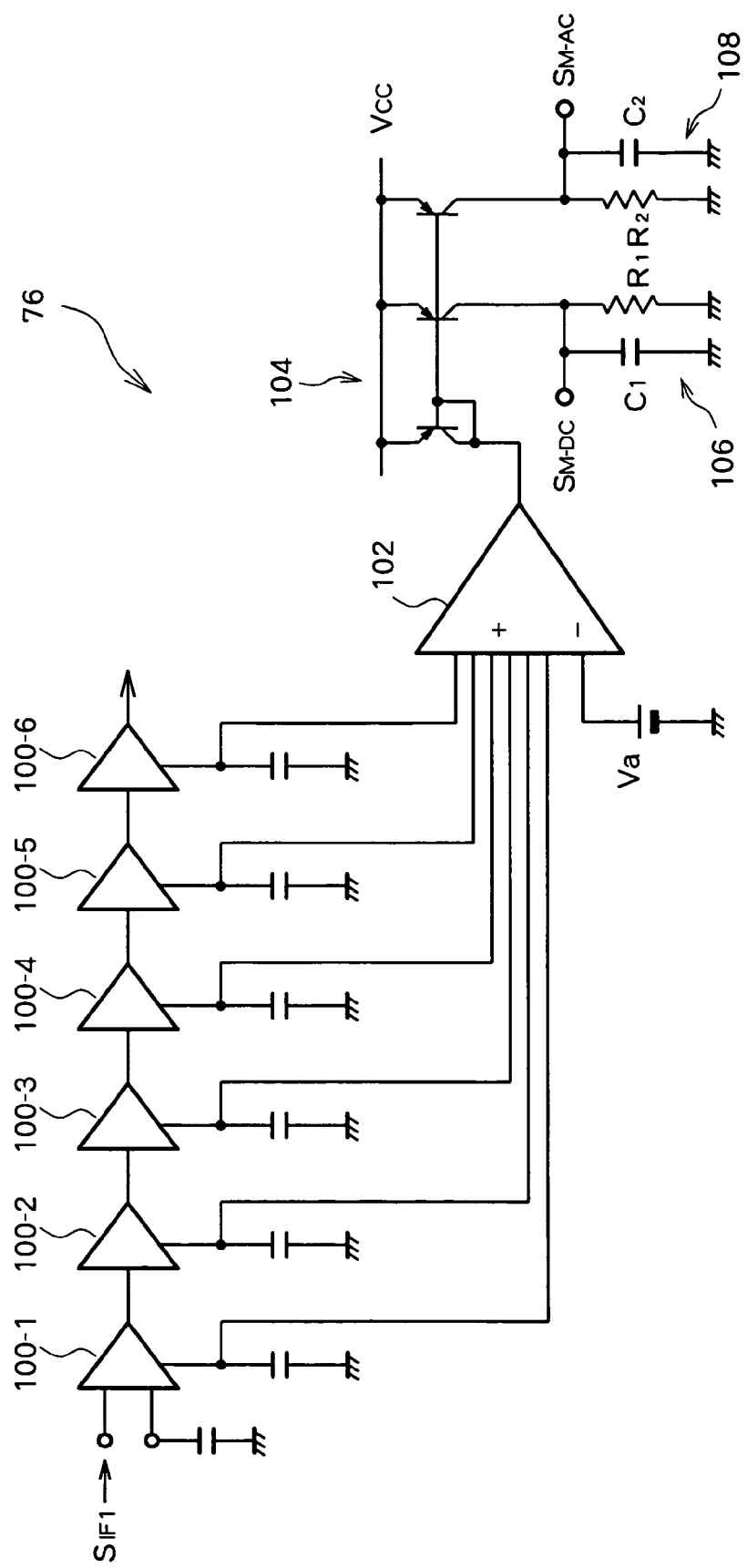
FIG. 4 is a circuit diagram showing a schematic configuration of an S meter circuit.

FIG. 4 is a circuit diagram showing a schematic configuration of the S meter circuit 76. The S meter circuit 76 comprises, for example, six stages of serially connected limiter amplifiers 100-1 through 100-6; an adder 102, into which the outputs from the limiter amplifiers are inputted in parallel; a current mirror circuit 104 for extracting the current used to generate $S_{M-DC}$ and $S_{M-AC}$ on the basis of an output current $I_{OUT}$ of the adder 102; and smoothing circuits 106, 108 for generating $S_{M-DC}$ and $S_{M-AC}$ on the basis of the output current of the current mirror circuit 104.

The $S_{IF1}$ is inputted into the first-stage limiter amplifier 100-1, and is sequentially amplified by each of the limiter amplifiers 100. Output signals $S_{Ak}$ of the limiter amplifiers 100-$k$ (where k is an integer such that $1 \leq k \leq 6$) are inputted to the adder 102. The adder 102 determines the voltage difference $\delta V_{Ak}$ between the $S_{Ak}$ signals and a reference voltage Va (i.e. $\delta V_{Ak} = S_{Ak} - Va$) When $\delta V_{Ak}$ is greater than zero, a current $\delta I_{Ak}$ corresponding to the voltage difference is generated, and the synthesized current is outputted as $I_{OUT}$.

$I_{OUT}$ is replicated, via a transistor $T_{r1}$ of an input channel of the current mirror circuit 104, to an output channel that has a transistor $T_{r2}$ and an output channel that has a transistor $T_{r3}$. The smoothing circuit 106 connected to the output channel that has the $T_{r2}$ comprises a resistor $R_1$ and a capacitor $C_1$, which are connected in parallel between a collector of the $T_{r2}$ and a ground potential GND. The smoothing circuit 106 smoothes $I_{out}$ outputted from the $T_{r2}$ using a time constant set according to the resistance $R_1$ and the capacitance $C_1$, and generates $S_{M-DC}$. For example, when $R_1$ is set to approximately 10 kΩ and $C_1$ is set to approximately 0.47 μF, a signal, which is adequately smoothed, and substantially regarded to be DC, can be obtained as $S_{M-DC}$.

The smoothing circuit 108, which is connected to the output channel that has the $T_{r3}$, comprises a resistor $R_2$ and a capacitor $C_2$, which are a connected in parallel between a collector of the $T_{r3}$ and a ground potential GND, in the same manner as the smoothing circuit 106. The smoothing circuit 108 smoothes $I_{out}$ outputted from the $T_{r3}$ using a time constant set according to the resistance $R_2$ and the capacitance $C_2$, and generates $S_{M-AC}$. For example, when $R_2$ is set to approximately 5.7 kΩ and $C_2$ is set to approximately 1000 pF, the time constant of the smoothing circuit 108 is a value that is approximately able to follow fluctuations in the amplitude of $S_{IF1}$. As a result, the adder 102 and the smoothing circuit 108 constitute an envelope detector, and extract fluctuations in the amplitude of $S_{IF1}$, which are caused by adjacent-channel interference and noise, as $S_{M-AC}$, which is an AC signal.

The pulse noise detection circuit 78 detects from $S_{M-AC}$ pulse noise arising from electrical devices in the surrounding area, and generates a pulse signal whose width corresponds to the duration of the noise. The pulse noise detection circuit 78 outputs the pulse signal to the bandwidth controller 82 (described below) as a gate signal for removing a pulse noise.

The AFC circuit 80 detects the frequency at which a strong signal is present in the vicinity of the existing reception frequency, and generates a voltage signal Vs corresponding to the difference between the frequency of the detected signal and the existing reception frequency (frequency drift). The voltage signal Vs is generally used in automatically tracking the target receiving station, but in the FM receiver 50 is also used in the control carried out by the bandwidth controller 82 when the detected strong signal can be determined to be adjacent-channel interference waves.

The IFBPF 70 is a bandpass filter in which $f_{IF2}$ is primarily used as the central frequency, and the transmission bandwidth $W_F$ can be variably set. The transmission bandwidth $W_F$ of the IFBPF 70 is controlled by the bandwidth controller 82. The bandwidth controller 82 controls $W_F$ on the basis of the detection output signal $S_{OUT}$ of the detection circuit 74; the outputs $S_{M-DC}$, $S_{M-AC}$ of the S meter circuit 76; the output pulse of the pulse noise detection circuit 78; and the output voltage signal Vs of the AFC circuit 80. For example, when no adjacent-channel interference waves are present, $W_F$ is set to a wide reference bandwidth in order to prevent audio distortion. On the other hand, when adjacent-channel interference waves are present, $W_F$ is made narrower than the reference bandwidth, thereby allowing adjacent-channel interference to be removed.

Figure 5:
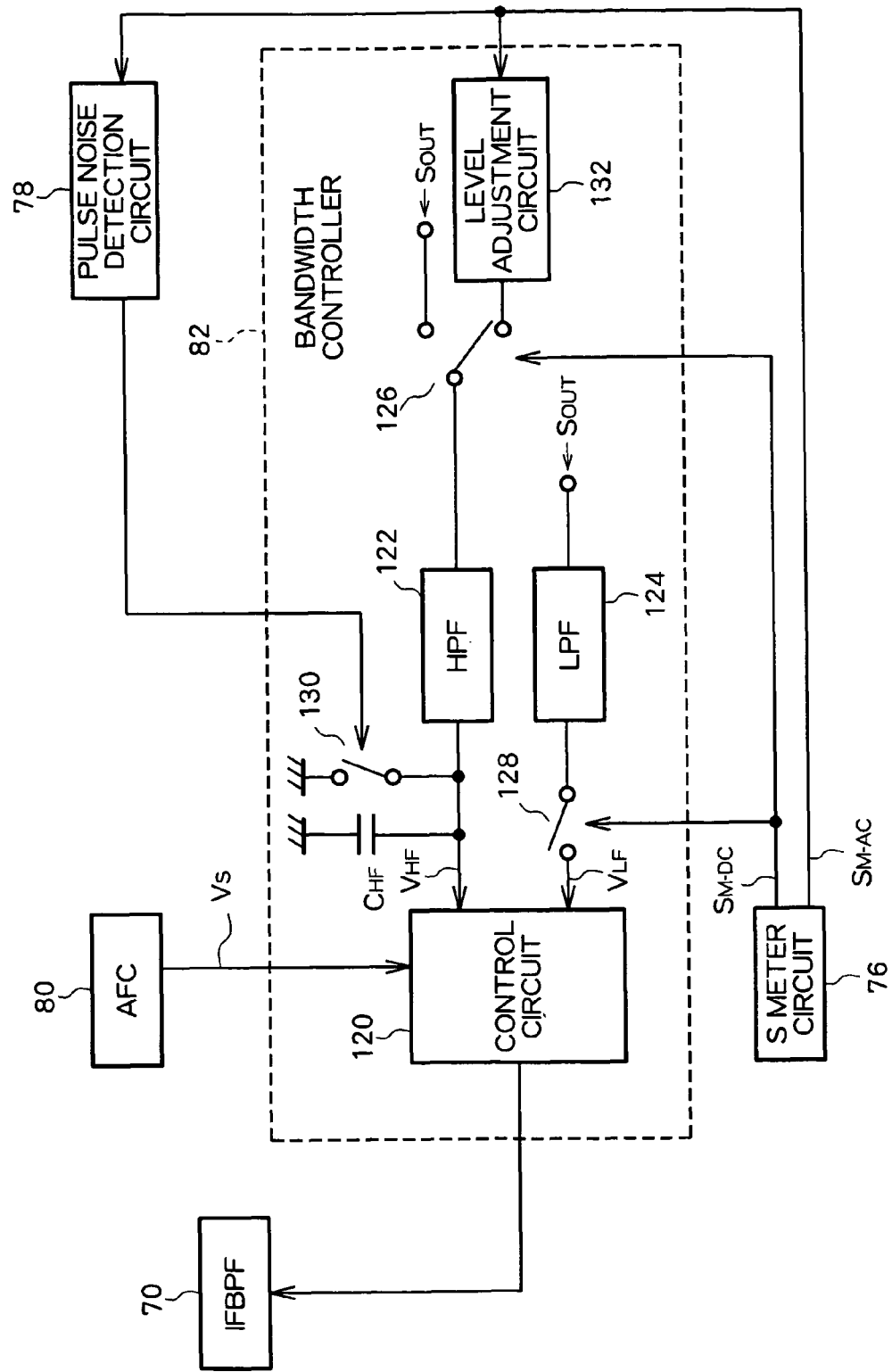
FIG. 5 is a block diagram showing a schematic configuration of a bandwidth controller in the FM receiver that is an embodiment of the present invention.

FIG. 5 is a block diagram showing a schematic configuration of the bandwidth controller 82. The bandwidth controller 82 comprises a control circuit 120, an HPF 122, a capacitor $C_{HF}$, an LPF 124, switch circuits 126, 128, 130, and a level adjustment circuit 132.

The switch circuit 126 receives $S_{OUT}$ and $S_{M-AC}$ as input signals, and selectively outputs either one to the HPF 122 on the basis of $S_{M-DC}$. Specifically, $S_{M-AC}$ is used in the switch circuit 126 as the output signal when a weak electric field is present; i.e., the reception electric field strength signal $S_{M-DC}$ is equal to or less than a predetermined threshold $d_{DC}$. $S_{OUT}$ is used as the output signal when an intermediate or stronger electric field is present; i.e., when $S_{M-DC}$ exceeds $d_{DC}$.

The HPF 122 has a cut-off frequency of approximately 100 kHz, for example, and transmits frequency components in the input signal that exceed the audio band. A capacitor $C_{HF}$ is connected between an output terminal of the HPF 122 and a ground. The capacitor $C_{HF}$ smoothes the high-pass signal components that have passed through the HPF 122, and the terminal voltage $V_{HF}$ of the $C_{HF}$ is inputted to the control circuit 120 as the output level of the HPF 122. As shall be described hereunder, the control circuit 120 controls $W_F$ according to whether $V_{HF}$ exceeds a predetermined threshold $d_{HF}$ (strong high-pass component state), or is equal to or less than $d_{HF}$ (weak high-pass component state).

The terminal that generates the voltage $V_{HF}$ of the capacitor $C_{HF}$ is configured so as to be capable of being grounded by the switch circuit 130. The switch circuit 130 is controlled by the pulse noise detection circuit 78, and is switched on by a pulse signal generated when the pulse noise detection circuit 78 detects pulse noise.

The level adjustment circuit 132 disposed between the S meter circuit 76 and the switch circuit 126 is provided in response to a property whereby the voltage of the noise included in $S_{M-AC}$ increases in a weak electric field. For example, the level adjustment circuit 132 reduces $S_{M-AC}$ in a weak electric field by a level that corresponds to $S_{M-DC}$ obtained simultaneously, and subsequently outputs $S_{M-AC}$. As a result, false detections, in which a strong high-pass component state is unnecessarily determined to be in effect due to noise in $S_{M-AC}$, are minimized. Specifically, the control circuit 120 can be configured so that the threshold $d_{HF}$, which is a fixed value regardless of whether or not a weak electric field state or an intermediate or stronger electric field state is in effect, is used to appropriately determine the strength of the high-pass components on the basis of $S_{OUT}$ and $S_{M-AC}$.

The LPF 124 receives $S_{OUT}$, and, e.g., audio band signal components contained in $S_{OUT}$ are allowed to pass through the low-pass filter. The output of the LPF 124 is inputted to the control circuit 120 via the switch circuit 128. The switch circuit 128 is controlled by $S_{M-DC}$, and is selectively switched on when the reception electric field strength is a predetermined weak electric field state.

The output voltage Vs of the AFC circuit 80 is inputted to the control circuit 120, and Vs can also be used to control the transmission bandwidth $W_F$ of the IFBPF 70.

The operation for controlling the transmission bandwidth $W_F$ of the IFBPF 70 will be described below. FIG. 6 is a diagram that illustrates the basic operation for controlling $W_F$. FIG. 6 shows whether $W_F$ is wide or narrow according to combinations of the magnitude of $V_{HF}$ and the magnitude of $S_{M-DC}$. The amount of high-pass components that pass through the HPF 122 can be used to determine whether adjacent-channel interference is occurring.

Specifically, the amount of high-pass components included in $S_{OUT}$ and $S_{M-AC}$ increases when adjacent-channel interference is occurring, and $V_{HF}$ increases to a high level. In this operation, the threshold $d_{HF}$ corresponding to $V_{HF}$ is set to a value that is suitable for determining whether adjacent-channel interference is present. The control circuit 120 switches $W_F$ according to whether or not $V_{HF}$ is greater than $d_{HF}$. Specifically, in a weak high-pass component state in which $V_{HF} \leq d_{HF}$, the control circuit 120 sets the transmission bandwidth $W_F$ to a reference bandwidth $w_W$. The reference bandwidth $w_W$ is a wide bandwidth in which audio distortion tends not to occur even when $S_{OUT}$ is highly modulated. In this case, minimizing audio distortion is given a higher priority than removing the adjacent-channel interference. On the other hand, in a strong high-pass component state in which $V_{HF} > d_{HF}$, the control circuit 120 sets the transmission bandwidth $W_F$ to a narrow reference bandwidth $w_N$ ($< w_W$), wherein it possible to suitably obtain an effect of removing adjacent-channel interference. In this case, removing the adjacent-channel interference is given a higher priority than preventing audio distortion.

In this operation, $W_F$ is set to a fixed value $w_N$ if a strong high-pass component state is in effect ($V_{HF} > d_{HF}$), regardless of the reception electric field strength. However, in a weak electric field state ($S_{M-DC} \leq d_{DC}$) and an intermediate or stronger electric field state ($S_{M-DC} > d_{DC}$), a point to take into consideration is that the type of signal inputted to the HPF 122, which is the basis for generating $V_{HF}$, has changed. The same holds true in a weak high-pass component state ($V_{HF} \leq d_{HF}$).

In the detection process, $S_{OUT}$ tends to contain high-pass noise components that bear little relation to the adjacent-channel interference. In contrast, $S_{M-AC}$ is not subjected to the detection process, and can therefore be expected to contain a correspondingly small amount of high-pass noise components. However, in an intermediate or stronger electric field state, $S_{M-AC}$ tends to contain multipath signals or the like as high-pass noise components that are not related to adjacent-channel interference. In the control operation, when a weak electric field state is in effect, $V_{HF}$ is generated on the basis of $S_{M-AC}$ and is used to detect adjacent-channel interference. When an intermediate or stronger electric field state is in effect, $V_{HF}$ is generated on the basis of $S_{OUT}$, and is used to detect adjacent-channel interference. It is thereby possible to prevent adjacent-channel interference from being mistakenly detected, and improve the accuracy with which the adjacent-channel interference is detected. Specifically, it is possible to accurately differentiate between cases where adjacent-channel interference must or must not be removed. As a result, it is possible to appropriately remove the adjacent-channel interference by reducing $W_F$, and minimize audio distortion by increasing $W_F$.

FIG. 7 is an illustration showing another operation for controlling $W_F$. As in FIG. 6, FIG. 7 is broadly divided into four cases according to the combination of the magnitude of $V_{HF}$ and the magnitude of $S_{M-DC}$. Whether $W_F$ is wide or narrow is shown corresponding to each of these cases. The control operation shown in FIG. 7 differs from the control operation described above in FIG. 6 in that the weak high-pass component state ($V_{HF} \leq d_{HF}$) and the weak electric field state ($S_{M-DC} \leq d_{DC}$) are further divided into a case of low modulation and a case of high modulation, and the bandwidth is set to a narrow bandwidth $w_N$ in the case of low modulation. The control circuit 120 determines that a low modulation state is in effect when the output level $V_{LF}$ of the LPF 124 is equal to or less than a predetermined threshold $d_{LF}$. The output of the LPF 124 is able to be inputted to the control circuit 120 by virtue of the fact that the switch circuit 128 is switched on in a weak electric field state. Accordingly, the control circuit 120 can determine that a weak electric field state is in effect when an input has been received from the LPF 124.

The amount of high-pass component noise may increase in $S_{OUT}$ when a weak electric field state is in effect, and the audio quality may decrease. Therefore, in the case of low modulation and a weak electric field state, the transmission bandwidth of the IFBPF 70 is set to the narrow bandwidth $w_N$, the amount of high-pass noise appearing in $S_{OUT}$ is reduced, and the audio quality can be improved, even when there is little need to set the bandwidth to the narrow bandwidth $w_N$ in view of the adjacent-channel interference due to the weak high-pass component state. In this case, at a low degree of modulation, audio distortion tends not to occur even if the bandwidth is set to the narrow bandwidth $w_N$.

However, even in a weak high-pass component state and a low degree of modulation, the amount of high-pass component noise described above is less in the case of an intermediate or stronger electric field than in a weak electric field state, and there is very little need to set the bandwidth to the narrow bandwidth $w_N$. In the present embodiment, the bandwidth is set to the reference bandwidth $w_W$, and priority is given to minimizing audio distortion. However, as described above, audio distortion also tends not to occur in this case, and the bandwidth can therefore be set to the narrow bandwidth $w_N$, and priority can accordingly be given to removing high-pass noise rather than to reducing audio distortion.

In the control operations described above, pulse noise generated from, e.g., a door mirror drive motor may be mistakenly detected as adjacent-channel interference. In other words, when pulse noise is generated, a corresponding pulse is also generated, e.g., in $S_{M-AC}$ inputted to the HPF 122. Pulse-type noise contains a large amount of high-frequency components, which accordingly pass through the HPF 122 and increase $V_{HF}$. Therefore, the high-frequency components may be mistakenly detected as adjacent-channel interference. The pulse noise detection circuit 78 and the switch circuit 130 constitute pulse noise cancelling circuits, and prevent adjacent-channel interference from being mistakenly detected due to the pulse noise. When pulse noise is detected, the pulse noise detection circuit 78 generates a pulse signal as a gate signal, as described above. This gate pulse switches on the switch circuit 130. The delay amount or other parameters of the circuit are adjusted so that the timing at which the switch circuit 130 is switched on matches the timing exhibited in a waveform corresponding to the pulse noise in the output of the HPF 122. When the switch circuit 130 is switched on, it is possible to prevent the $C_{HF}$ from becoming charged by the waveform of the pulse noise. Accordingly, it is possible to avoid cases in which $V_{HF}$ exceeds $d_{HF}$ and is detected as adjacent-channel interference. As a result of the $C_{HF}$ being charged, $V_{HF}$ reaches a level that is equal to or less than $d_{HF}$, and the bandwidth is set to the reference bandwidth $w_W$, even in cases where adjacent-channel interference is actually present. The adjacent-channel interference removing function is thereby cancelled. However, the width of the pulse noise is an extremely short interval, and the width of the gate pulse generated by the pulse noise detection circuit 78 is set to a short interval according to the width of the pulse noise. As a result, adverse effects due to the cancelling of the adjacent-channel interference-removing function can be limited.

The output signal Vs of the AFC circuit 80 can also be used in the control operation described above. For example, when the reception electric field strength of the target reception station is low and the reception electric field strength of a station that is subject to adjacent-channel interference is high, then Vs can become abnormally higher than, e.g., cases in which only the target reception station is receiving, or cases in which the adjacent-channel interference waves are weaker than the target reception signal. In view of the foregoing, it may be possible for a differentiation to be made, based on Vs, between normal frequency drift and frequency drift caused by adjacent-channel interference. The control circuit 120 can be configured so that the bandwidth is set to the narrow bandwidth $w_N$ when adjacent-channel interference is detected on the basis of at least either $V_{HF}$ or Vs, or to the narrow bandwidth $w_N$ only when $V_{HF}$ and Vs both indicate adjacent-channel interference.

In the present invention, a fluctuation component signal is used to detect adjacent-channel interference in a weak electric field state, and a detection output signal is used to detect adjacent-channel interference in an electric field whose strength exceeds a weak electric field state; i.e., an intermediate or stronger electric field state. The fluctuation component signal is generated without being subjected to a detection process, and therefore contains no noise generated during detection. Accordingly, in comparison to the detected output signal, the fluctuation component signal contains much less noise that is likely to be mistakenly detected as adjacent-channel interference in a weak electric field state. Consequently, according to the present invention, it is possible to accurately determine whether adjacent-channel interference is being generated in a weak electric field state. According to the determination result, it is possible to appropriately select between setting a bandpass filter to a narrow bandwidth in order to remove the adjacent-channel interference, and setting the bandpass filter to a wide bandwidth in order to prevent audio distortion.

A reference value is set according to the output level of the high-pass filter in order to determine whether adjacent-channel interference is present. According to the present invention, there are no restrictions, such as conventionally encountered, that require the reference value to be set to a high value in order to minimize audio distortion in a weak electric field state. As a result, when the same reference value is set for a weak electric field state and an intermediate or stronger electric field state, the fact that adjacent-channel interference is preferably removed in an intermediate or stronger electric field state can be more readily taken into account. Specifically, the adjacent-channel interference characteristics can be improved in an intermediate or stronger electric field state.

The fluctuation component signal has a property of increasing in an intermediate or stronger electric field state. Accordingly, in an intermediate or stronger electric field state, the detection output signal is used in the present invention instead of the fluctuation component signal to determine the presence of adjacent-channel interference. Multipath signals or the like contained in the fluctuation component signal are prevented from being mistakenly detected as adjacent-channel interference.

The strength signal generating circuit and the fluctuation component signal generating circuit of the present invention constitute the S meter circuit 76 in the above embodiment. As described above, the S meter circuit 76 smoothes the signal being measured according to an intermediate signal $S_{IF}$; generates an electric field strength signal $S_{M-DC}$; subjects the signal being measured to envelope detection; and generates a fluctuation component signal $S_{M-AC}$.

As described above, the bandwidth controller 82 has a low-pass filter 124 for receiving the detection output signal $S_{OUT}$, and allowing the audio band to pass through; and a low-pass component input control switch circuit 128, which is selectively switched on in a weak electric field state, and is capable of inputting a signal from the low-pass filter to the control circuit 120. As was described with reference to FIG. 7, the control circuit 120 can be configured so as to set the transmission bandwidth $W_F$ to a narrow bandwidth in a weak electric field state and a weak low-pass component state (low modulation state) in which the output level of the low-pass filter 124 is equal to or lower than a predetermined reference value.

Audio distortion tends to occur in a high modulation state; and in a weak electric field state or a low modulation state, there is little need for setting the transmission bandwidth of the bandpass filter to a wide bandwidth in order to prevent audio distortion. Therefore, as described above, in a weak electric field state or a low modulation state, setting the transmission bandwidth of the bandpass filter to a narrow bandwidth enables the noise contained in the detection output signal to be reduced As described above, the bandwidth controller 82 has a high-pass filter output capacitor $C_{HF}$, which smoothes signals that have passed through the high-pass filter 122, and generates a voltage to be the output level of the high-pass filter 122; and a pulse noise cancelling circuit (the pulse noise detection circuit 78 and the switch circuit 130), which detects the occurrence of pulse noise, and prevents the high-pass filter output capacitor $C_{HF}$ from being charged by the pulse noise. The high-pass filter output capacitor and the pulse noise cancelling circuit can prevent the output level of the high-pass filter from exceeding the reference value when pulse noise is generated. According to this configuration, it is possible to avoid the pulse noise being mistakenly detected as adjacent-channel interference, and reducing the transmission bandwidth. It is also possible to prevent unnecessary audio distortion.

What is claimed is:

1. An FM receiver, comprising:
   an intermediate signal generating circuit for subjecting a reception signal to frequency conversion in which a carrier frequency of a received target FM signal is shifted to a predetermined intermediate frequency, and generating an intermediate signal;
   a bandpass filter for allowing a transmission bandwidth to be variably set, and transmitting the received target FM signal that has been converted to the intermediate signal;
   a detection circuit for subjecting the received target FM signal that has passed through the bandpass filter to detection, and generating a detection output signal;
   a bandwidth controller for controlling the transmission bandwidth of the bandpass filter;
   a strength signal generating circuit for generating, on the basis of the intermediate signal, an electric field strength signal according to the strength of a reception electric field; and
   a fluctuation component signal generating circuit for generating a fluctuation component signal according to fluctuation in an amplitude of the intermediate signal; wherein
   the bandwidth controller comprises:
   a high-pass filter, which has a cut-off frequency that exceeds an audio band;
   a switch circuit for selecting either the detection output signal or the fluctuation component signal according to the electric field strength signal, and inputting the selected signal to the high-pass filter; and
   a control circuit for controlling the transmission bandwidth on the basis of whether a weak high-pass component state or a strong high-pass component state is in effect, with the weak high-pass component state occurring when the output level of the high-pass filter is equal to or less than a predetermined reference value, and the strong high-pass component state occurring when the output level exceeds the reference value; wherein the switch circuit outputs the fluctuation component signal when the reception electric field strength is in a predetermined weak electric field state, and outputs the detection output signal when the reception electric field strength exceeds the weak electric field state; and the control circuit sets the transmission bandwidth to a predetermined wide bandwidth in the weak high-pass component state, and sets the transmission bandwidth to a narrow bandwidth, which is narrower than the wide band width, in the strong high-pass component state.

2. The FM receiver of claim 1, further comprising:

a signal meter circuit composed of the strength signal generating circuit and the fluctuation component signal generating circuit; and the signal meter circuit smoothing a signal to be measured according to the intermediate signal, generating the electric field strength signal, subjecting the signal that is to be measured to envelope detection, and generating the fluctuation component signal.

3. The FM receiver according to claim 1; comprising:

the bandwidth controller having:

a low-pass filter, which receives the detection output signal, and allows the audio band to pass through; and a low-pass component input control switch circuit, which is selectively switched on in the weak electric field state, and which is capable of inputting a signal from the low-pass filter to the control circuit;

the control circuit setting the transmission bandwidth to the narrow bandwidth when the weak high-pass component state is both in the weak electric field state and in a weak low-pass component state in which an output level of the low-pass filter is equal to or less than a predetermined reference value.

4. The FM receiver of claims 1, comprising:

the bandwidth controller having:

a high-pass filter output capacitor for smoothing a transmission signal of the high-pass filter, and generating a voltage that is the output level of the high-pass filter; and a pulse noise cancelling circuit for detecting the appearance of pulse noise, and preventing the high-pass filter output capacitor from being charged by the pulse noise.

5. The FM receiver of claims 1, comprising:

the FM receiver being of a double-conversion format in which a first intermediate signal is inputted as the intermediate signal to the strength signal generating circuit and the fluctuation component signal generating circuit, and a second intermediate signal, which is obtained by down-converting the first intermediate signal, is inputted to the band pass filter.

* * * * *